(12) United States Patent
Gatlin et al.

(10) Patent No.: US 8,707,978 B2
(45) Date of Patent: Apr. 29, 2014

(54) BREAKING PUMPABLE HYDROCARBON GELS

(75) Inventors: Larry W. Gatlin, San Antonio, TX (US); Glen E. Walden, The Woodlands, TX (US); Ernest McMillan, Kingwood, TX (US); Richard A. Gatlin, Montgomery, TX (US); Wayne Mueller, Airdrie (CA)

(73) Assignee: CST Performance Products Corp., Conroe, TX (US)

( * ) Notice: Subject to any disclaimer, the term of this patent is extended or adjusted under 35 U.S.C. 154(b) by 300 days.

(21) Appl. No.: 13/200,768

(22) Filed: Sep. 30, 2011

(65) Prior Publication Data

US 2013/0081819 A1    Apr. 4, 2013

(51) Int. Cl.
*C09K 3/00* (2006.01)

(52) U.S. Cl.
USPC ............................................ 137/13; 516/113

(58) Field of Classification Search
USPC ......... 137/3, 13; 166/308.1; 516/113; 585/15
See application file for complete search history.

(56) References Cited

U.S. PATENT DOCUMENTS

| | | | |
|---|---|---|---|
| 3,818,991 A | 6/1974 | Nimerick | |
| 5,488,103 A | 1/1996 | Gatlin | |
| 5,498,707 A | 3/1996 | Gatlin | |
| 7,140,433 B2 | 11/2006 | Gatlin et al. | |
| 7,164,051 B2 * | 1/2007 | Rivers et al. | 137/13 |
| 7,211,665 B2 | 5/2007 | Gatlin | |

* cited by examiner

*Primary Examiner* — Kevin Lee
(74) *Attorney, Agent, or Firm* — Beck & Thomas, P.C.

(57) ABSTRACT

Where the loss of volatile organics during storage of high gravity oil is minimized by forming a flowable or pumpable gel in the high gravity oil, (and/or condensates and distillates), as they are introduced to a storage vessel, the gel is broken by the addition of a small amount of an amine/formaldehyde reaction product, which may be either a triazine or a mixture of non-triazine reaction products. The previously gelled hydrocarbon may then by more readily moved by draining or pumping into a pipeline.

16 Claims, No Drawings

BREAKING PUMPABLE HYDROCARBON GELS

TECHNICAL FIELD

The invention relates to the storage and transportation of high gravity oil, (and/or condensates and distillates). High gravity oil, condensates and distillates protected from undesired volatilization by a weak (pumpable) gel are moved through a pipeline or otherwise after the gel is broken, by addition of a gel breaker, notably by an amine/formaldehyde reaction product, which may be a triazine.

BACKGROUND OF THE INVENTION

The American Petroleum Institute's system of classifying crude oils includes designations by gravity, relating the oil to the density of water. By this system, a high gravity oil is one which contains a high concentration of volatile, low molecular weight hydrocarbons, and a lower gravity oil will contain fewer such components.

When a high gravity oil is recovered from the ground and placed in a tank or other vessel not equipped with a special seal or vent designed to contain or minimize vapor emissions, substantial losses of light hydrocarbons can be incurred simply from evaporation and volatilization. This not only represents an economic loss but also is environmentally undesirable; moreover, some of the volatile components—for example, benzene, toluene and xylene in the atmosphere—could be hazardous for nearby workers.

Liquid storage is also commonly provided for liquid components removed from natural gas, sometimes known as "condensates and distillates." Although in the liquid phase at the time of removal from the produced gas, they tend to include significant concentrations of readily volatilized light hydrocarbons, which are especially vulnerable to loss.

Some tanks and other storage vessels are equipped with special seals, pressure controls, or vents made to suppress emissions not only during static storage conditions, but also when the tanks are being filled or when the contents are being removed, and otherwise when there may be a degree of turbulence in them. Variations in head space when the liquid level is low or when the vessel is near filled are of course important factors in volatilization, as are variations in temperature, which affect vapor pressures. Numerous storage tanks in the field—in the vicinity of producing wells—are not equipped with the expensive vents necessary to adjust to such variations. As seen in U.S. patent application Ser. No. 13/136,237 filed Jul. 27, 2011 by one of the inventors herein, formation of a pumpable gel in the stored hydrocarbons will inhibit undesired volatilization of the lighter hydrocarbons in storage. Presence of the gel may be undesirable, however, when the hydrocarbons are to be trucked or piped to a new location for use or further storage, perhaps temporary. A convenient method of breaking the gel to reduce the cost and difficulty of moving the high gravity oil or condensates is needed.

SUMMARY OF THE INVENTION

We have found that a weak, or pumpable, hydrocarbon gel may be readily broken for transport by adding to it a small amount of an amine/formaldehyde reaction product.

Although this invention is applicable to lower gravity oils, it is most useful for high gravity oils, designated 33° API or higher, and is well suited for oils in the range of 40-45° API. Perhaps the most beneficial use is with respect to "condensates and distillates," typically produced with natural gas, and sometimes described as "natural gas liquids," having API gravities of 45° to 60°. For our purposes in this application, a high gravity oil is defined as one having a gravity of 33° API or higher, including an API value higher than 60°, regardless of whether it is a crude oil or is derived from natural gas; for example, a condensate (we consider "condensate" and "distillate" to be interchangeable for our purposes) from natural gas.

As indicated in the above referenced U.S. patent application Ser. No. 13/136,237, the high gravity rating of high gravity oils and condensates in storage can be preserved by forming a weak gel in the high gravity oil or condensate as it is conducted from the producing well to the storage tank, it being understood that other steps, such as filtration, may be practiced also during transport. By a weak gel we mean one which is flowable and pumpable using common oilfield equipment, so that the normal passage from well to storage, including whatever equipment or treatment steps are between, will not be unduly retarded by a suddenly induced high viscosity. A strong gel is not necessary to retard emissions in storage, and would require further treatment, perhaps involving the introduction of undesirably large amounts of chemicals, to remove from the storage vessel.

Hydrocarbon gels are commonly used for fracturing fluids, the gelling agents having been found to be excellent aids for suspending propping agents. Virtually any gelling agent useful in a hydrocarbon fracturing fluid may be used to form the weak gel. Well known gelling compositions have two basic components—a phosphorous-containing gelling agent, and a crosslinking agent including a source of polyvalent metal; by a polyvalent metal, we mean iron or aluminum. A weak gel generally will entail lower concentrations of the gelling composition than are used in fracturing.

Our invention acts upon the weakly gelled hydrocarbon fluid to break the gel and permit transfer by draining or pumping. Most transfers of the stored hydrocarbons will involve the use of a pump, and even draining transfers will also include passage through a pipe. Far too much energy would be required to propel even a weakly gelled hydrocarbon fluid through any significant pipeline length, and drainage even through a short pipe could consume far too much time. An object of our invention is therefore to reduce the energy and/or time required to transfer a stored, weakly gelled, hydrocarbon fluid to truck or through a pipeline.

DETAILED DESCRIPTION OF THE INVENTION

The gelling agents which we break will be any of the combinations of phosphorous-containing gelling agents and crosslinkers containing a source of polyvalent metal described in the following patents, all of which are incorporated herein specifically in their entirety:

Monroe U.S. Pat. No. 3,505,374, describing gels made with a reaction product of $Fe_3O_4$ and an alkyl oleyl diester of orthophosphoric acid. Other diesters of phosphoric acid may be used.

Crawford U.S. Pat. No. 3,757,864 uses aluminum salts of alkyl aliphatic orthophosphate diesters as friction reducers in flowing hydrocarbons.

Griffin, in U.S. Pat. No. 4,153,649, lists, in just a few lines of column 1, eighteen US patents said to describe organic phosphoric acid esters used to thicken organic liquids, and summarizes his invention in claim 1 as an organic phosphate ester composition having as a property the ability to increase the viscosity of kerosene when admixed in kerosene with sodium aluminate, said composition being prepared by the process which comprises the reaction of: [A] a pentavalent phosphorus compound selected from the group consisting of $P_2O_5$ and a mixture of $P_2O_5$ with polyphosphoric acid; [B] a hydroxy ether of the formula $ROR_1OH$ wherein R is a $C_1$ to $C_6$ alkyl group, $R_1$ is a $C_2$ or $C_3$ alkylene group and the total carbon atoms of R and $R_1$ range from 3 to about 8; and [C] when the total carbon atoms of R and $R_1$ is 3 or 4, a long chain substantially unsubstituted monohydric aliphatic alcohol containing at least 5 carbon atoms, but when the total carbon atoms of R and $R_1$ is 5 to 8, an alcohol selected from the group consisting of a long chain substantially unsubstituted monohydric aliphatic alcohol containing at least 5 carbon atoms, a short chain substantially unsubstituted monohydric aliphatic alcohol containing from 1 to 4 carbon atoms and a mixture of said alcohols, the individual mole ratios of the hydroxy ether, the long chain alcohol and the short chain alcohol to total $P_2O_5$ being within the ranges of 0.4:1 to 4.5:1; 0:1 to 4.0:1 and 0:1 to 5.0:1 respectively, said reaction being conducted at temperature ranging from about 70.degree. to about 90.degree. C. for a period of time of from about 1.5 to about 6 hours, and said pentavalent phosphorus compound, hydroxy ether, and alcohol or alcohols being provided in molar ratios and admixed in a sequence effective to provide a reaction product suitable for use in increasing the viscosity of kerosene. See also Griffin's U.S. Pat. Nos. 4,174,283 and 4,152,289 disclosing additional aluminum salts of phosphate esters useful for gelling fracturing fluids.

In U.S. Pat. No. 4,316,810, Burnham uses the term "pumpable" as desirable for gelled fracturing fluids. He describes a class of aluminum oxaalkyl phosphates useful for the purpose.

As indicated in Smith & Persinski U.S. Pat. No. 5,571,315 and related patents, a common orthophosphate diester may be expresses as $HPO_4RR'$ where R is a straight or branched chain alkyl, aryl, alkoxy, or alkaryl group having about 6 to about 18 carbon atoms and R' is hydrogen or an aryl, alkaryl, alkoxy, or alkyl group having up to about 18 carbon atoms. These phosphates are combined with ferric aluminum citrate to make gels in hydrocarbon based fracturing fluids.

More complicated phosphorous-containing gelling agents are described by Jones et al in U.S. Pat. No. 5,990,053 and U.S. Pat. No. 6,147,034. Generally, they are two-component systems, one providing a phosphorous-containing gelling agent and the other providing a polyvalent metal, typically aluminum or iron. But see also Taylor et al U.S. Pat. No. 7,534,745, who utilize as the phosphorous-containing gelling agent various organophosphonic acid esters and organophosphinic acid esters, again together with a polyvalent metal.

Our invention is applicable to any weak gel made from a two-component system comprising a phosphorous-containing gelling component and a polyvalent metal containing crosslinking component. More particularly, our invention is applicable to any weak gel made from a two-component system comprising (a) an orthophosphate diester of the formula $HPO_4RR'$ where R is a straight or branched chain alkyl, aryl, alkoxy, or alkaryl group having about 6 to about 18 carbon atoms and R' is hydrogen or an aryl, alkaryl, alkoxy, or alkyl group having up to about 18 carbon atoms may be used as the phosphorous-containing material, and (b) any known aluminum or iron-containing crosslinker such as sodium aluminate or polyaluminum chloride, or any of the iron crosslinkers mentioned in the above patents or used commercially in formation fracturing. Typically, the weak gel will have been made by adding to the high gravity oil 0.001 to 0.02 parts by volume of the phosphate gelling component and 0.001 to 0.02 parts by volume of the polyvalent metal containing crosslinking component. Gelation is effected by crosslinking and, conversely, the term "breaking" is used herein in its conventional sense, that at least some of the crosslinkages are destroyed or rendered ineffective, significantly reducing or eliminating the strength of the gel.

If the storage vessel is discharged into a sales line, transmission line, or other pipeline of some length, the user may wish to break the gel just prior to beginning discharge in order not to unnecessarily consume energy in pumping because of the viscosity of the gel, even though it is a weak gel. If the storage vessel is discharged into a truck, it may be more efficient to wait until the truck arrives at its destination; the benefits of high gravity preservation will thereby be obtained while the truck holds the weakly gelled hydrocarbons. Addition of the gel breaker can be made either to the holding vessel or truck or directly to a pipe or other conduit. Addition can be "batch" or substantially continuous if the material is flowing, and may be coordinated with a stabilizer or other system where light ends are deliberately separated.

Reaction products of amines and formaldehyde are useful in our invention to break weak gels. Several such reaction products will be described.

Reaction Product A

The following is adapted from Example 2 of Gatlin's U.S. Pat. No. 5,488,103 describing products which are effective as hydrogen sulfide scavengers. The composition is produced in two stages: In the first stage, about 40 weight percent of a mixture of 85 weight percent monoethanolamine and 15 weight percent water is added to about 60 weight percent of a mixture of 37 weight percent formaldehyde and 7 weight percent methanol in water. In the second stage, the first stage reaction product is titrated with amine heads obtained from Monsanto Chemical to a pH ranging between about 10.5 and about 12.0, or until polymerization occurs and formaldehyde and formaldehyde donor disappears. This occurs when about 14 weight percent amine heads is added to about 86 weight percent of the first stage reaction product. A black liquid product is produced that contains some insoluble polymer, which may precipitate. Amine heads are an unrefined mixture of alkyl diamines having about 4 to 6 carbon atoms, commercially available as a byproduct of the manufacture of hexamethylene diamine and similar products. Such mixtures commonly include various cyclic amines.

Reaction Product A can be further reacted with methanol to obtain a product Reaction Product A+) which is also useful in our invention to break weak hydrocarbon gels.

Reaction Product B

Another reaction product of formaldehyde and an amine which can be used in our invention is sometimes known as S-triazine. This compound can be described as 1,3,5 ($2H_2$, $4H_2$, $6H_2$) tripropanediamine N,N,N',N',N'',N'' hexamethyl, and may sometimes be known as 1,3,5-tris[(3-dimethylamine)propyl] hexahydro. The compound may be referred to herein as "TPDAHM triazine" for tripropyldiaminehexamethyl. A ring compound is formed by reacting dimethylaminopropylamine with formaldehyde (preferably paraformaldehyde):

$3(CH_3)_2N\ CH_2\ CH_2\ CH_2\ NH_2\quad +\quad 3HCHO\quad \longrightarrow$

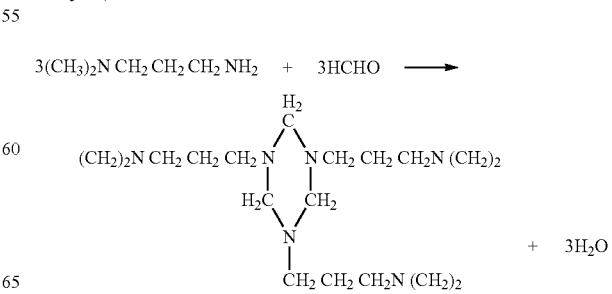

$+\quad 3H_2O$

As related in U.S. Pat. No. 7,211,665, the formaldehyde may be used in excess; in the above formula, for example, the expression 3HCHO may read 3-6HCHO—that is, the formaldehyde may be used in a molar ratio to the amine of 1:1 to 2:1, 3:1 or more, i.e. as much as a 10:1 ratio of formaldehyde to amine may be appropriate. See pages 13 and 14 of GB 2245588A for a description of a preferred synthesis. One mole of the dimethylaminopropylamine (DMAPA) is dissolved in toluene and stirred. One mole of paraformaldehyde is added. The reaction mixture is heated, preferably to reflux, and the evolved water may be collected. After water evolution is completed, the solvent is removed by heating under vacuum.

In a preferred method, the DMAPA is charged to a clean, dry reactor equipped with a vent line, along with a desired amount of a hydrophobic solvent, for example an aliphatic solvent; as a particular example, isoparaffin, and the paraformaldehyde is charged in increments of 20% of the desired amount, every 15 or 20 minutes, with mixing as needed to control the exotherm. Close the reactor and vent, and continue to mix, maintaining a temperature between 180-200 F for 14 to 16 hours. Distill off the water; increase temperature slowly, bearing in mind the DMAPA boils at 275° F., to 310-320° F. to continue to remove water. The product is effective to break gels in hydrocarbon liquids.

In any of the methods mentioned above, the formaldehyde may be in the form of an inhibited or an uninhibited solution, and may include up to 60% or more methanol. Where methanol is included, 1,3,5-tri-(2-hydroxy-2-ethyl)-hexahydro-s-triazine, also useful in out invention, is produced. Another triazine derivative useful in our invention is 1,3,5-tri-(2-hydroxyethyl)-hexahydro-s-triazine A preferred method of making our 1,3,5 ($2H_2,4H_2,6H_2$) tripropanediamine N,N,N',N',N",N" hexamethyl is to autocondense the compound $(CH_3)_2N\ CH_2\ CH_2\ CH_2\ N\!=\!CH_2$. This may be done in the presence of paraformaldehyde, which, it is believed, acts as a catalyst. In this reaction, no water is coproduced:

Reaction Product C

Reactions of certain amines and formaldehyde do not result in triazine compounds but are effective in our invention. As is known in the art, a primary amine must be present in the reaction mix for a triazine to form; as it is sometimes observed, the labile hydrogen of the primary amine is necessary for triazine formation, as with the monoethanolamine of Reaction Product A and the dimethylaminopropylamine of Reaction Product B above. But we find it is not necessary to have a triazine to break the weak gel; we may use, for example, dimethylamine, diethylamine, diethanolamine, or higher amines (dialkyl and dialkanolamines having up to six carbon atoms), for reaction with formaldehyde.

Reaction Product C1: Diethylamine is reacted with formaldehyde in the form of formalin, generally with a molar excess of formalin, in a molar ratio of formaldehyde to diethylamine of from 2:1 to 3:1. A reaction product comprising a Schiff base is formed and may be used effectively in our invention. A triazine is not formed.

Reaction Product C2: Diethanolamine is reacted with formaldehyde as formalin, generally with a molar excess of formalin, in a molar ratio of formaldehyde to diethylamine of from 2:1 to 3:1. A reaction product containing a Mannich base is formed and may be used effectively in our invention. A triazine is not formed.

Reaction Product D 31 parts by weight methylamine is added to a reactor equipped with internal coils and a chiller, operating at 32 to 55 degrees Fahrenheit. 60 parts by weight of 50% uninhibited formalin (stored at about 120° F. is added slowly under pressure; the temperature is maintained at about 100-105° F. until the reaction is complete. About 44 parts by weight methylamine triazine will be obtained; the product may be used successfully in our invention.

Reaction Product E 61 parts by weight ethanolamine is charged to a reactor with mixing and cooling. Slowly add 31.6 parts of 93-95% paraformaldehyde, watching exotherms and allowing the reaction to reach a temperature of 180° F. The reaction will yield about 73.75 parts of ethanolamine triazine, nominally 80% active. This reaction product can be used to break weak hydrocarbon gels as described elsewhere herein. Triazines made in a similar manner from methoxypropylamine, tertiarybutylamine, butylamine, and many other primary amines and mixtures thereof can be used to make reaction products useful in our invention.

Reaction Product F

A mixture comprising tertiary amines and oligomers of formaldehyde is made by reacting formaldehyde, either as formalin or paraformaldehyde, in molar excess, with secondary amines. Such reaction mixtures are also effective as weak gel breakers in our invention.

Reaction Product G 59 parts by weight monoisopropanolamine are charged to a reactor with agitation and cooling. With cooling to 100 to 150 F, 81 parts by weight 37% formalin is slowly added. Yield is about 71 parts of triazine having isopropanol substitutions. A similar reaction will take place when isopropyl amine is used instead of isopropanol amine. Products of both reactions can be used to break gels in our invention.

Adding the Breaker

Hydrocarbon gels of the type described herein are readily broken by the addition of a small amount of any of the reaction products described herein, or a triazine of the type described, made in any manner. The amount to be added may vary from 0.01% by volume to 2.0% by volume of the hydrocarbon gel. Proportionate continuous additions may be made if the breaker product is added to a pipe or conduit of pumpable gel as it is pumped or drained from a storage vessel. That is, if the pumpable gel is removed from the vessel at a rate of 10 gallons per minute, for example, the breaker may be injected into it, preferably upstream of the pump, at a rate of 0.001 gallons per minute to 0.02 gallons per minute. If a pump is used to remove the gel, and the breaker is injected upstream of the pump, excellent mixing will be obtained and the breaking of the gel will occur almost instantaneously in the pump. Depending on the particular circumstances, such as temperature, for example, it may be more economical to add the breaker as a slug to the vessel. Overaddition of the breaker is more likely to occur in the pumping situation since the addition is normally continuous. Overaddition is not desirable only in an economic sense, as excess breaker within the above concentrations is not normally deleterious to the hydrocarbon. It may commonly be expected that a very small amount of breaker will be effective to a commensurately small degree, but where a pump is involved, breaking of the weak gel is greatly accelerated, and accordingly amounts in the low end of the range are recommended to begin with.

The invention claimed is:

1. Method of dispensing a weakly gelled hydrocarbon fluid from a vessel, said weakly gelled hydrocarbon fluid including a gelled gelling composition comprising a phosphorous-containing gelling component and a polyvalent metal crosslinking component, said method comprising (a) adding to said weakly gelled hydrocarbon fluid an amount of an amine/formaldehyde reaction product effective to break said gelled gelling composition and (b) withdrawing said hydrocarbon fluid from said vessel.

2. Method of claim 1 wherein step (b) is performed by pumping said hydrocarbon fluid from said vessel.

3. Method of claim 1 wherein step (b) is performed by draining said hydrocarbon fluid from said vessel.

4. Method of claim 1 wherein said amine/formaldehyde reaction product comprises a triazine.

5. Method of claim 4 wherein said amine/formaldehyde reaction product comprises S-triazine.

6. Method of claim 1 wherein said weakly gelled hydrocarbon fluid comprises newly produced crude oil.

7. Method of claim 6 wherein said hydrocarbon fluid has an API oil gravity of at least 33°.

8. Method of claim 1 wherein said weakly gelled hydrocarbon fluid comprises condensates from newly produced natural gas.

9. Method of claim 8 wherein said hydrocarbon fluid has an API oil gravity of at least 45°.

10. Method of claim 1 wherein said gelling agent comprises a phosphate-containing gelling component and an aluminum-containing crosslinking component.

11. Method of claim 1 wherein said gelling agent comprises a phosphate-containing gelling component and an iron-containing crosslinking component.

12. Method of claim 1 wherein said amine/formaldehyde reaction product is added at a concentration of 0.01 parts by volume to 2.0% by volume of the hydrocarbon gel.

13. Method of breaking a weakly gelled hydrocarbon fluid having an API oil gravity of at least 33°, said weakly gelled hydrocarbon fluid containing 0.001 to 0.02 parts by volume of a phosphate containing gelling component and 0.001 to 0.02 parts by volume of a polyvalent metal containing crosslinking component, said method comprising adding to said weakly gelled hydrocarbon fluid an amine/formaldehyde reaction product in an amount at least 0.01 parts to 2.0 parts by volume of said weakly gelled hydrocarbon fluid.

14. Method of claim 13 including passing said weakly gelled hydrocarbon fluid containing said amine/formaldehyde reaction product through a pump.

15. Method of claim 14 wherein said amine/formaldehyde reaction product comprises a triazine.

16. Method of transferring a weakly gelled high gravity oil from a storage vessel to a remote destination comprising (a) breaking said weakly gelled high gravity oil by adding thereto 0.01% to 2.0% by volume of the hydrocarbon gel of an amine/formaldehyde reaction product, thereby obtaining a high gravity oil of reduced gel strength, (b) pumping said high gravity oil of reduced gel strength from said storage vessel into a pipe, and (c) transferring said high gravity oil through said pipe to said remote destination, thereby utilizing less energy for said pumping than otherwise would be required.

* * * * *